US010142825B2

(12) United States Patent
Koike

(10) Patent No.: US 10,142,825 B2
(45) Date of Patent: Nov. 27, 2018

(54) COMMUNICATION APPARATUS COMMUNICATING WITH EXTERNAL APPARATUS BY WIRELESS COMMUNICATION, METHOD FOR CONTROLLING COMMUNICATION APPARATUS, AND STORAGE MEDIUM

(71) Applicant: CANON KABUSHIKI KAISHA, Tokyo (JP)

(72) Inventor: Kohtaro Koike, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/672,077

(22) Filed: Aug. 8, 2017

(65) Prior Publication Data

US 2018/0048988 A1 Feb. 15, 2018

(30) Foreign Application Priority Data

Aug. 12, 2016 (JP) ................................ 2016-158903

(51) Int. Cl.

*H04W 4/80* (2018.01)
*H04W 76/14* (2018.01)
*H04W 12/06* (2009.01)
*H04W 84/12* (2009.01)
*H04W 84/18* (2009.01)

(52) U.S. Cl.

CPC ............ *H04W 4/80* (2018.02); *H04W 12/06* (2013.01); *H04W 76/14* (2018.02); *H04W 84/12* (2013.01); *H04W 84/18* (2013.01)

(58) Field of Classification Search

CPC ....... H04W 4/80; H04W 4/008; H04W 76/14; H04W 76/18; H04W 76/10; H04W 76/023; H04W 84/12; H04W 84/18

See application file for complete search history.

(56) References Cited

U.S. PATENT DOCUMENTS

| | | | | |
|---|---|---|---|---|
| 2008/0166966 A1* | 7/2008 | Hamasaki | H04B 1/3805 | 455/41.2 |
| 2011/0105179 A1* | 5/2011 | Tanabe | H04M 1/72533 | 455/556.1 |
| 2011/0177780 A1* | 7/2011 | Sato | H04W 36/14 | 455/41.1 |
| 2014/0368675 A1* | 12/2014 | Hiroki | H04W 52/0229 | 348/207.2 |
| 2016/0021230 A1* | 1/2016 | Watanabe | H04M 1/7253 | 348/552 |

(Continued)

FOREIGN PATENT DOCUMENTS

JP 2016-76744 A 5/2016

*Primary Examiner* — Junpeng Chen

(74) *Attorney, Agent, or Firm* — Canon U.S.A., Inc. IP Division

(57) ABSTRACT

A communication apparatus includes a first wireless communication unit, a second wireless communication unit, and a control unit, wherein the control unit performs control to execute processing for sharing a communication parameter with an external apparatus via the second wireless communication unit before a request for connecting via the first wireless communication unit becomes able to be communicated with the external apparatus via the second wireless communication unit, where the communication parameter is used in connecting to the external apparatus via the first wireless communication unit.

19 Claims, 11 Drawing Sheets

(56) References Cited

U.S. PATENT DOCUMENTS

| | | | | |
|---|---|---|---|---|
| 2016/0029151 | A1* | 1/2016 | Hara | H04W 4/008 455/41.1 |
| 2016/0171260 | A1* | 6/2016 | Tanabe | G06K 7/10297 340/10.51 |
| 2016/0227014 | A1* | 8/2016 | Takagi | H04M 1/7253 |
| 2017/0048696 | A1* | 2/2017 | Kurihara | H04W 48/20 |
| 2017/0223579 | A1* | 8/2017 | Lee | H04W 28/16 |

* cited by examiner

COMMUNICATION APPARATUS COMMUNICATING WITH EXTERNAL APPARATUS BY WIRELESS COMMUNICATION, METHOD FOR CONTROLLING COMMUNICATION APPARATUS, AND STORAGE MEDIUM

BACKGROUND

Field

The present disclosure relates to a communication apparatus configured to communicate with an external apparatus by wireless communication.

Description of the Related Art

Cameras equipped with a wireless communication function such as a wireless local area network (LAN) function have heretofore been known. To connect to another apparatus using such wireless communication, a user has needed to input communication parameters, including a service set identifier (SSID) and a password, into both apparatuses. To try and make this easier on the user, apparatuses including a function (handover function) of sharing communication parameters by using other communications, such as near field communication (NFC) and Bluetooth®, and of switching to a wireless communication function to be used, have been developed. Apparatuses using Bluetooth® Low Energy (BLE) for lower power consumption have also been known in recent years (Japanese Patent Application Laid-Open No. 2016-76744). The low power consumption of Bluetooth® Low Energy is achieved by adjusting intervals of communication (connection intervals). More specifically, the longer the connection intervals are, the lower the power consumption is. However, response and communication speed decrease accordingly. If there is data to be communicated or in scenes in which user operations are likely to be made, the connection intervals are therefore set to be short to increase response and communication speed.

Bluetooth® Low Energy connection intervals are difficult to instantly change by specification and the amount of information that can be exchanged by one communication is extremely small. For example, as discussed in Japanese Patent Application Laid-Open No. 2016-76744, if the communication parameters are exchanged after the switching to the wireless LAN communication is instructed, it takes a long time to switch to the wireless LAN communication.

SUMMARY

According to an aspect of the present disclosure, a communication apparatus includes, a first wireless communication unit, a second wireless communication unit, and a control unit, wherein the control unit is configured to perform control to execute processing for sharing a communication parameter with an external apparatus via the second wireless communication unit before a request for connecting via the first wireless communication unit becomes able to be communicated with the external apparatus via the second wireless communication unit, where the communication parameter is used in connecting to the external apparatus via the first wireless communication unit.

According to another aspect of the present disclosure, a communication apparatus includes, a first wireless communication unit, a second wireless communication unit, and a control unit, wherein the control unit is configured to perform control to execute processing for sharing a communication parameter with an external apparatus via the second wireless communication unit before an instruction to transmit a request for connecting via the first wireless communication unit to the external apparatus via the second wireless communication unit becomes able to be accepted from a user, where the communication parameter is used in connecting to the external apparatus via the first wireless communication unit.

Further features will become apparent from the following description of exemplary embodiments with reference to the attached drawings.

DESCRIPTION OF THE EMBODIMENTS

Exemplary embodiments will be described in detail below with reference to the accompanying drawings.

The exemplary embodiments described below are mere examples. Modifications and changes can be made as appropriate according to configurations and various conditions of apparatuses to which the exemplary embodiment is applied. The exemplary embodiments can be combined as appropriate.

<Configuration of Digital Camera>

Figure 1A:
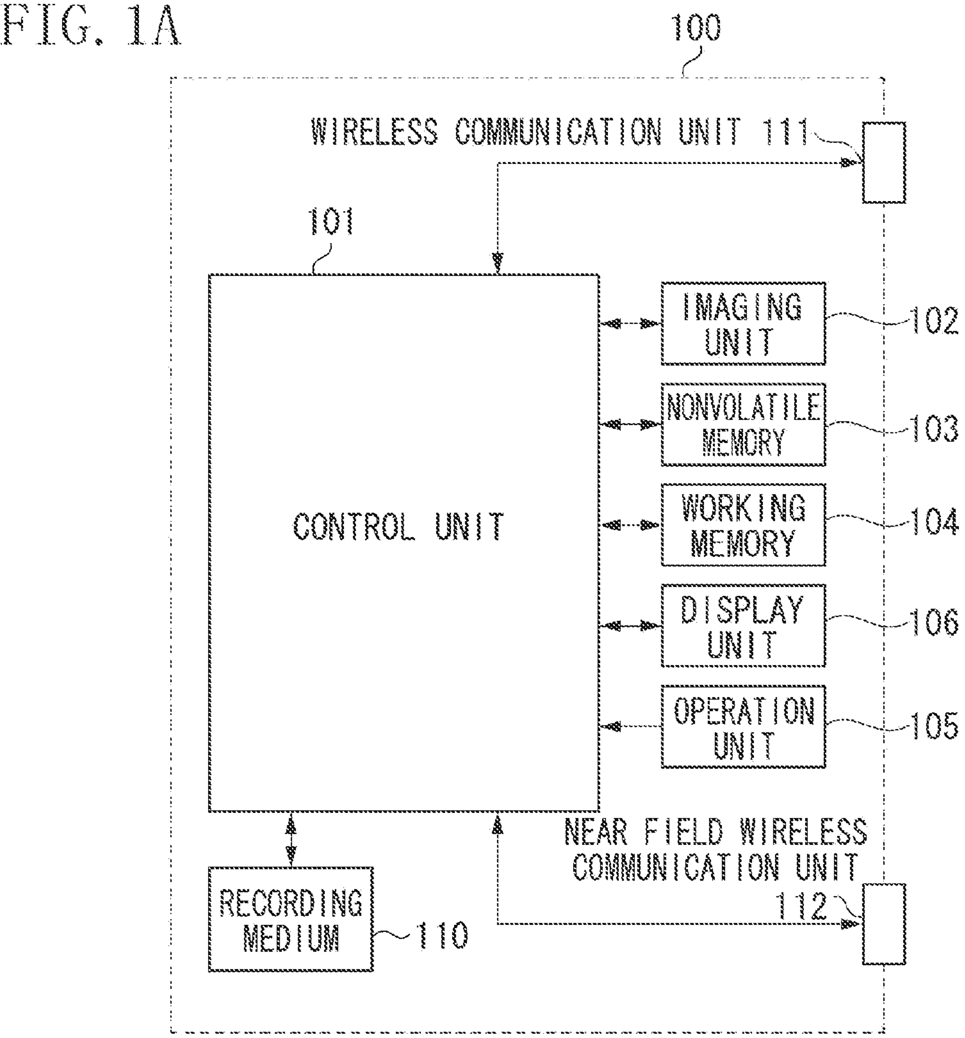
FIG. 1A is a block diagram of a digital camera according to a first exemplary embodiment.

FIG. 1A is a block diagram illustrating a configuration example of a digital camera 100, which is an example of a communication apparatus according to a first exemplary embodiment. While a digital camera is described as an example of the communication apparatus, the communication apparatus is not limited thereto. For example, the communication apparatus can be a portable media player or an information processing apparatus, such as a tablet device or a personal computer.

A control unit 101 controls various parts of the digital camera 100 according to input signals and a program to be described below. Instead of the control unit 101 controlling the entire apparatus, a plurality of pieces of hardware can perform processing in a distributed manner to control the entire apparatus.

An imaging unit 102 includes, for example, an optical lens unit, an optical system in which a diaphragm, zooming, and focusing are controlled, and an image sensor for converting light (picture) introduced through the optical lens unit into an electrical picture signal. Typical examples of the image sensor include a complementary metal oxide semiconductor (CMOS) image sensor and a charge coupled device (CCD) image sensor. The imaging unit 102, controlled by the control unit 101, converts object light focused by a lens included in the imaging unit 102 into an electrical signal by the image sensor, performs noise reduction processing, and outputs digital data as image data. The digital camera 100 according to the present exemplary embodiment records the image data on a recording medium 110 according to the Design rule for Camera File system (DCF) standard.

A nonvolatile memory 103 is an electrically erasable and programmable nonvolatile memory, and stores the program to be executed by the control unit 101. The program will be described below. A working memory 104 is used as a buffer memory for temporarily holding the image data captured by the imaging unit 102, an image display memory for the display unit 106, and a work area of the control unit 101.

An operation unit 105 is used to accept user instructions to the digital camera 100. For example, the operation unit 105 includes a power button by which the user provides instructions to power ON and OFF the digital camera 100, a release switch for providing instructions to perform imaging, and a playback button for providing instructions to reproduce image data. The operation unit 105 also includes operation members, such as a dedicated connection button, for starting communication with an external apparatus via a wireless communication unit 111 (described below).

The operation unit 105 includes a touch panel formed on a display unit 106 (described below). The release switch includes switches SW1 and SW2. If the release switch enters a half-pressed state, the switch SW1 turns ON. Instructions for making imaging preparations such as automatic focus (AF) processing, automatic exposure (AE) processing, automatic white balance (AWB) processing, and flash preliminary emission (electronic flash (EF)) processing are thereby accepted. If the release switch enters a fully-pressed state, the switch SW2 turns ON. An instruction to start imaging is thereby accepted.

A display unit 106 displays a viewfinder image at a time of imaging, captured image data, and characters for interactive operations. The display unit 106 does not necessarily need to be integrated with the digital camera 100. The digital camera 100 can be connected to an external display unit 106, and can at least include a display control function of controlling display of the display unit 106.

The recording medium 110 can record the image data output from the imaging unit 102. The recording medium 110 can be configured to be attachable to and detachable from the digital camera 100. The record medium 110 can be built in the digital camera 100. In other words, the digital camera 100 can include at least a means for accessing the recording medium 110.

The wireless communication unit 111 is an interface for connecting to an external apparatus. The digital camera 100 according to the present exemplary embodiment can exchange data with an external apparatus via the wireless communication unit 111. For example, the image data generated by the imaging unit 102 can be transmitted to an external apparatus via the wireless communication unit 111. In the present exemplary embodiment, the wireless communication unit 111 includes an interface for communicating with an external apparatus by wireless LAN communication according to an Institute of Electrical and Electronic Engineers (IEEE) 802.11 standard, i.e., Wi-Fi® communication. The control unit 101 controls the wireless communication unit 111 to implement wireless communication with an external apparatus. The communication system is not limited to a wireless LAN. Other wireless communication systems, such as an infrared communication system, are applicable. The wireless communication unit 111 is an example of a first wireless communication unit. For example, the Picture Transfer Protocol over Internet Protocol (PTP/IP) via a wireless LAN can be used as a protocol for data communication.

A near field wireless communication unit 112 includes, for example, an antenna for wireless communication, and a modulation and demodulation circuit and a communication controller for processing wireless signals. The near field wireless communication unit 112 implements near field wireless communication according to the IEEE 802.15 standard by outputting a modulated wireless signal from the antenna and demodulating a wireless signal received at the antenna. In the present exemplary embodiment, the near field wireless communication unit 112 communicates with other apparatuses according to the IEEE 802.15.1 standard (Bluetooth®). In the present exemplary embodiment, low power consumption Bluetooth® Low Energy version 4.0 is employed for Bluetooth® communication. Bluetooth® Low Energy communication includes a communication coverage narrower than (i.e., communicable distance shorter than) that of wireless LAN communication. Communication speed of Bluetooth® Low Energy communication is slower than that of wireless LAN communication. Bluetooth® Low Energy communication is lower than wireless LAN communication in power consumption. The digital camera 100 according to the present exemplary embodiment maintains an always-on connection with an external apparatus via the near field wireless communication unit 112. A notification to switch to a wireless LAN connection is then issued through Bluetooth® Low Energy communication in response to an operation from the digital camera 100 or the external apparatus, whereby a wireless LAN connection can be automatically established.

The wireless communication unit 111 of the digital camera 100 according to the present exemplary embodiment includes an access point (AP) mode and a client (CL) mode. In the AP mode, the wireless communication unit 111 operates as an AP in an infrastructure mode. In the CL mode, the wireless communication unit 111 operates as a client in the infrastructure mode. With the wireless communication unit 111 operating in the CL mode, the digital camera 100 according to the present exemplary embodiment can operate as a CL apparatus in the infrastructure mode. If the digital camera 100 operates as a CL apparatus, the digital camera 100 can connect to an AP apparatus nearby and join a network formed by the AP apparatus.

With the wireless communication unit 111 operating in the AP mode, the digital camera 100 according to the present exemplary embodiment can operate as a simplified AP of limited functionality (hereinafter, simplified AP). The simplified AP is a kind of AP. If the digital camera 100 operates as a simplified AP, the digital camera 100 forms a network by itself. Apparatuses in the vicinity of the digital camera 100 can identify the digital camera 100 as an AP apparatus and join the network formed by the digital camera 100. The program for operating the digital camera 100 as described above is stored in the nonvolatile memory 103.

The digital camera 100 according to the present exemplary embodiment is a simplified AP, but does not include a gateway function of transferring data received from CL apparatuses to an Internet provider. Even if the digital camera 100 receives data from another apparatus joining the network formed by the digital camera 100, the digital camera 100 is unable to transfer the data to another network, such as the Internet.

Figure 1B:
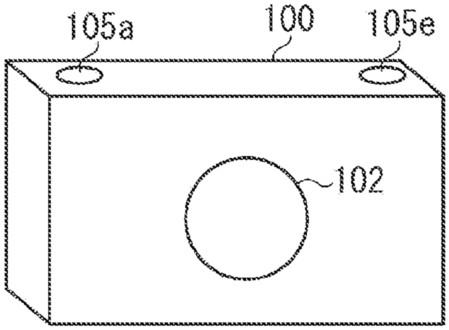
FIGS. 1B and 1C are external views of the digital camera according to a first exemplary embodiment.
Figure 1C:
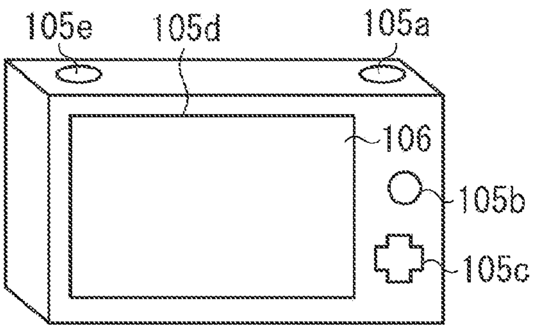

Next, an appearance of the digital camera 100 will be described. FIGS. 1B and 1C are diagrams illustrating an example of the appearance of the digital camera 100. A release switch 105*a*, a playback button 105*b*, a direction key 105*c*, a touch panel 105*d*, and a power switch 105*e* are operation members included in the above-described operation unit 105. The display unit 106 displays an image obtained as a result of imaging by the imaging unit 102.

<Internal Configuration of Mobile Phone 200>

Figure 2:
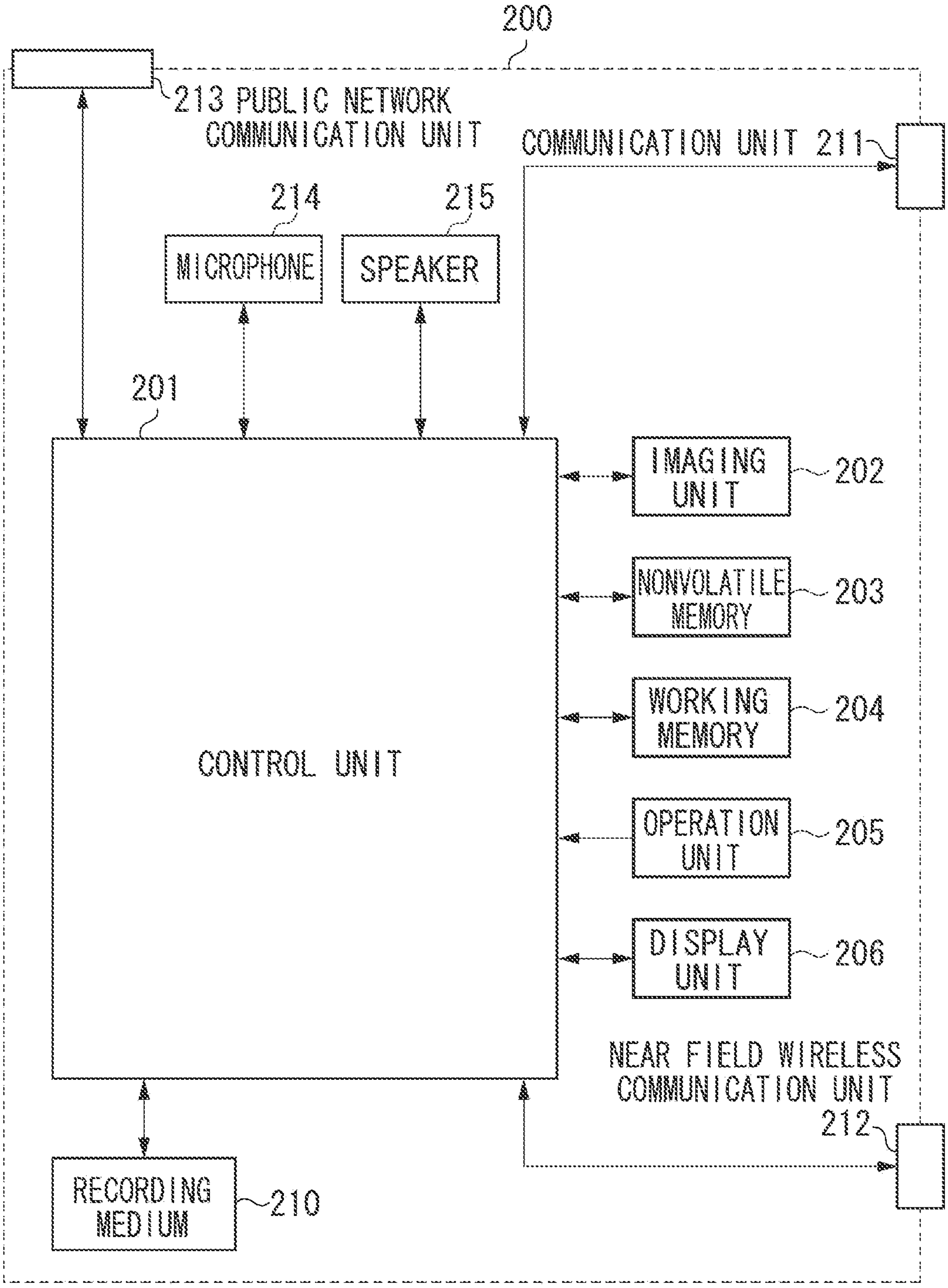
FIG. 2 is a block diagram illustrating a configuration of a mobile phone according to the first exemplary embodiment.

FIG. 2 is a block diagram illustrating a configuration example of a mobile phone 200 that is an example of an information processing apparatus according to the present exemplary embodiment. While a mobile phone is described as an example of the information processing apparatus, the information processing apparatus is not limited thereto. For example, the information processing apparatus can be a digital camera, a tablet device, or a personal computer with a wireless function.

A control unit 201 controls various parts of the mobile phone 200 according to input signals and a program (described below). Instead of the control unit 201 controlling the entire apparatus, a plurality of pieces of hardware can perform processing in a distributed manner to control the entire apparatus.

An imaging unit 202 converts object light focused by a lens included in the imaging unit 202 into an electrical signal, performs noise reduction processing, and outputs digital data as image data. The captured image data is stored in a buffer memory. The control unit 201 then performs a predetermined calculation thereon and records the resulting image data on a recording medium 210.

A nonvolatile memory 203 is an electrically erasable and programmable nonvolatile memory. The nonvolatile memory 203 stores an operating system (OS), which is basic software to be executed by the control unit 201, and applications for implementing applicative functions in cooperation with the OS. In the present exemplary embodiment, the nonvolatile memory 203 stores an application for communicating with the digital camera 100. In the following description, a camera control application for performing remote control on the imaging of the digital camera 100 and the browsing and saving of captured images via Bluetooth® will be described as an example.

A working memory 204 is used as an image display memory of a display unit 206 and a work area of the control unit 201.

An operation unit 205 is used to accept instructions to the mobile phone 200 from a user. For example, the display unit 206 includes a power button by which the user gives instructions to power ON/OFF the mobile phone 200, and operation members such as a touch panel formed on the display unit 206.

The display unit 206 displays images as well as characters for interactive operations. The display unit 206 does not necessarily need to be integrated in the mobile phone 200. The display unit 206 can be externally connected to the mobile phone 200, where the mobile phone 200 includes at least a display control function of controlling display of the display unit 206.

A recording medium 210 can record the image data output from the imaging unit 202. The recording medium 210 can be configured to be attachable to and detachable from the mobile phone 200. The recording medium 210 can be integrated with the mobile phone 200. In other words, the mobile phone 200 can include at least a means for accessing the recording medium 210.

A communication unit 211 is an interface for connecting to an external apparatus. The mobile phone 200 according to the present exemplary embodiment can exchange data with the digital camera 100 via the communication unit 211. In the present exemplary embodiment, the communication unit 211 is an antenna. The control unit 201 can connect to the digital camera 100 via the antenna. The control unit 201 can connect to the digital camera 100 directly or via an AP. For example, the PTP/IP via a wireless LAN can be used as a protocol for data communication. The communication with the digital camera 100 is not limited thereto. For example, the communication unit 211 can include wireless communication modules such as an infrared communication module and a Wireless Universal Serial Bus (USB) module.

A near field wireless communication unit 212 includes, for example, an antenna for wireless communication, and a modulation and demodulation circuit and a communication controller for processing wireless signals. The near field wireless communication unit 212 implements near field wireless communication according to an IEEE 802.15 standard by outputting a modulated wireless signal from the antenna and demodulating a wireless signal received at the antenna. In the present exemplary embodiment, the near field wireless communication unit 112 communicates with other apparatuses according to the IEEE 802.15.1 standard (Bluetooth®). In the present exemplary embodiment, low power consumption Bluetooth® Low Energy version 4.0 is employed for Bluetooth® communication.

A public network communication unit 213 is an interface used for performing public wireless communication. The mobile phone 200 can implement a telephone call with another apparatus via the public network communication unit 213. The control unit 201 implements the telephone call by inputting and outputting audio signals via a microphone 214 and a speaker 215. In the present exemplary embodiment, the public network communication unit 213 is an antenna. The control unit 201 can connect to a public network via the antenna. A single antenna can serve as both the communication unit 211 and the public network communication unit 213.

Figure 3:
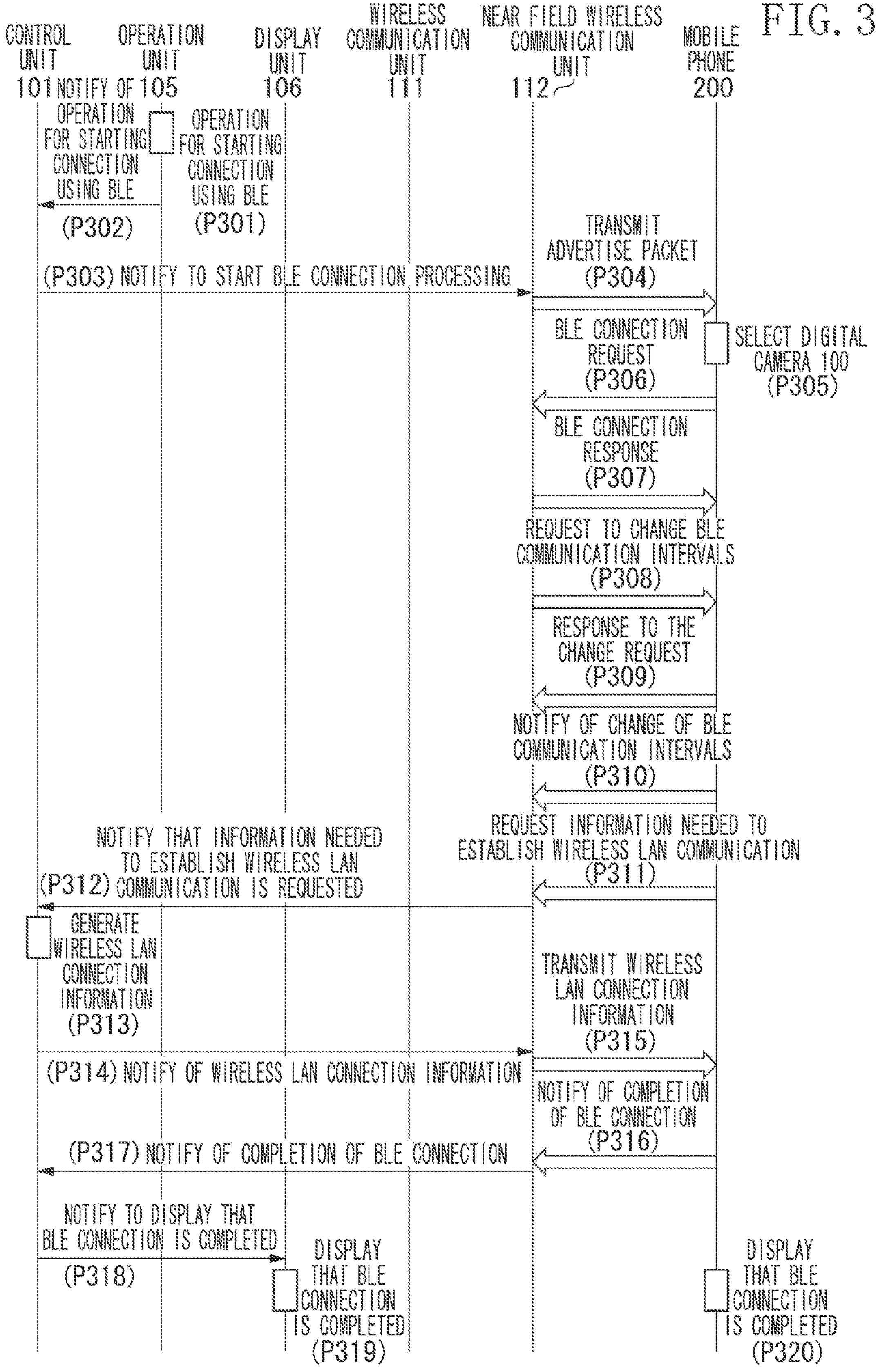
FIG. 3 illustrates a sequence for wireless local area network (LAN) connection information notification from the digital camera to a mobile phone according to the first exemplary embodiment.

FIG. 3 illustrates a Bluetooth® Low Energy connection sequence between the digital camera 100 and the mobile phone 200 according to the present exemplary embodiment. In the following description, the camera control application is running on the mobile phone 200.

Figure 4A:
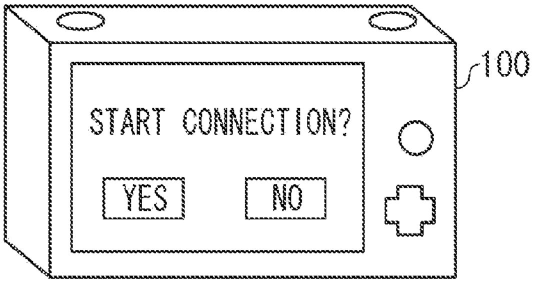
FIGS. 4A, 4B, 4C, 4D, 4E, and 4F are schematic diagrams illustrating an operation of the digital camera and the mobile phone during the wireless LAN connection information notification according to the first exemplary embodiment.
Figure 4B:
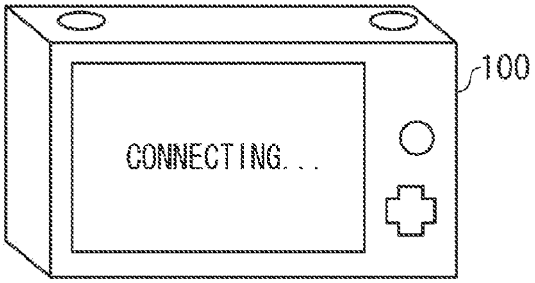

First, the user operates the digital camera 100 to display a communication menu illustrated in FIG. 4A. In step P301, the user makes an operation via the operation unit 105 to start connection with the mobile phone 200 using near field wireless communication (in the present exemplary embodiment, Bluetooth® Low Energy), on the screen of FIG. 4A. The "yes" button displayed on the screen of FIG. 4A can be selected to input an operation to start connection with the mobile phone 200 using Bluetooth® Low Energy. If the operation is accepted, then in step P302, the control unit 101 is notified that the operation to start connection with the mobile phone 200 using Bluetooth® Low Energy is made. The screen of the digital camera 100 transitions to the screen illustrated in FIG. 4B.

In step P303, the control unit 101, upon being notified of the operation to start connection with the mobile phone 200, notifies the near field wireless communication unit 112 to start Bluetooth® Low Energy connection processing. In step P304, the near field wireless communication unit 112 starts to periodically transmit an advertise packet for notifying apparatuses in the vicinity of the digital camera 100 of the presence of the digital camera 100.

Figure 4C:
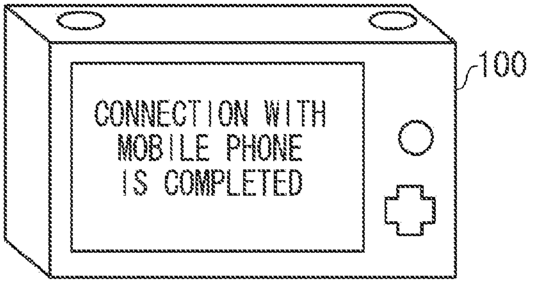
Figure 4D:
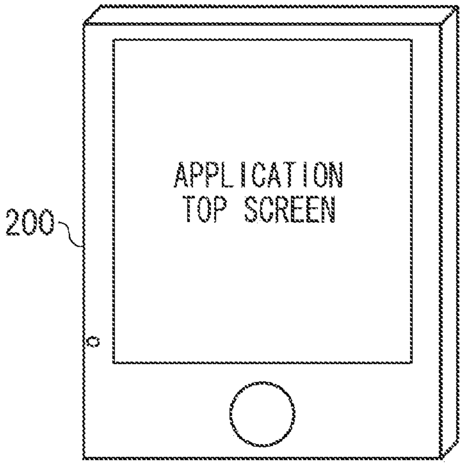
Figure 4E:
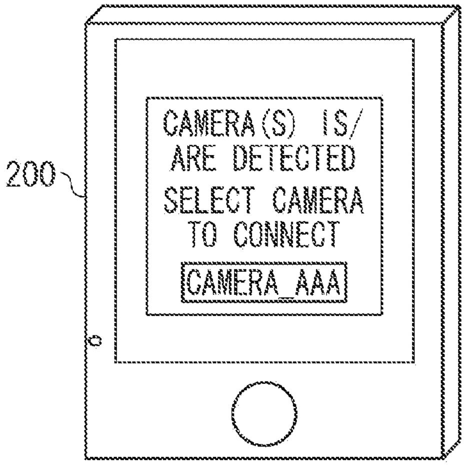
Figure 4F:
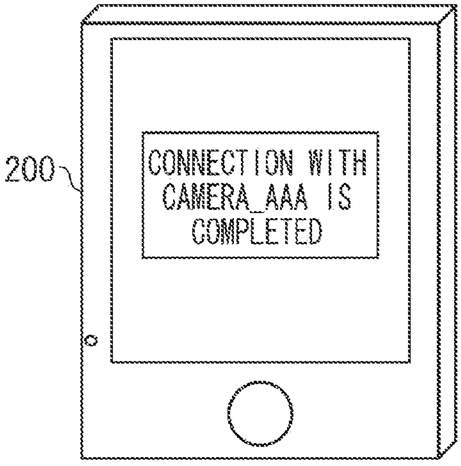

If the mobile phone 200 receives the advertise packet, a notification is made on the screen of the camera control application that the digital camera 100 is detected. As a result thereof, the screen of the mobile phone 200 transitions from the screen of FIG. 4D to the screen of FIG. 4E. FIG. 4E illustrates a screen when only the digital camera 100 is detected. In the example of a list on the screen of FIG. 4E, a character string "camera_AAA" for identifying the digital camera 100 is displayed. The character string is identification information included in the advertise packet from the digital camera 100. If there is any other apparatus that transmits an advertise packet, identification information about the apparatus is also listed. In step P305, the user selects the digital camera 100 from the displayed list. With this operation, in step P306, the mobile phone 200 transmits a Bluetooth® Low Energy connection request to the near field wireless communication unit 112. In step P307, the near field wireless communication unit 112 receives the Bluetooth® Low Energy connection request, and transmits a Bluetooth® Low Energy connection response to the mobile phone 200. Through this operation, a Bluetooth® Low Energy connection between the digital camera 100 and the mobile phone 200 is established. At this timing, services using Bluetooth® Low Energy are controlled so as not to be able to start the services. The services using Bluetooth® Low Energy include a handover service for sharing the communication parameters of the wireless LAN with the mobile phone 200 via Bluetooth® Low Energy and connecting to the wireless LAN without the user inputting the communication parameters. In other words, the user is unable to provide an instruction to start the handover service yet. The screens of FIGS. 4C and 4F are not displayed yet. The following processing is performed before transition to such screens.

After the connection is established by the near field wireless communication, in step P308, the near field wireless communication unit 112 transmits a change request for Bluetooth® Low Energy connection intervals to the mobile phone 200. In step P309, the mobile phone 200 transmits a response for the change request to the near field wireless communication unit 112. In step P310, the mobile phone 200 notifies the near field wireless communication unit 112 of a change of the Bluetooth® Low Energy connection intervals. With this notification, the near field wireless communication unit 112 and the mobile phone 200 perform near field wireless communication with each other at new connection intervals. For example, the communications in steps P311, P315, and P316 (described below) are executed at timings according to the connection intervals set at this timing.

In step P311, the mobile phone 200 requests information required to establish wireless LAN communication from the near field wireless communication unit 112. In step P312, the near field wireless communication unit 112 notifies the control unit 101 that the information required to establish wireless LAN communication is requested. In response thereto, in step P313, the control unit 101 generates wireless LAN connection information. As employed herein, the wireless LAN connection information refers to the communication parameters of the wireless LAN. Examples include a service set identifier (SSID), a password, and an Internet Protocol (IP) address of the digital camera 100. If the Bluetooth® Low Energy connection is disconnected, the wireless LAN connection information is discarded. For reconnection, wireless LAN connection information can be generated again. A random SSID and a random password can be generated upon each Bluetooth® Low Energy connection. This can increase security.

In step P314, the control unit 101 notifies the near field wireless communication unit 112 of the generated wireless LAN connection information. In step P315, the near field wireless communication unit 112 transmits the wireless LAN connection information to the mobile phone 200.

In step P316, the mobile phone 200 obtains the wireless LAN connection information, and then notifies the near field wireless communication unit 112 that the connection with the mobile phone 200 via Bluetooth® Low Energy communication is completed. In step P317, the near field wireless communication unit 112 notifies the control unit 101 of the completion. In step P318, the control unit 101 notifies the display unit 106 to display that the Bluetooth® Low Energy connection with the mobile phone 200 is completed. In step P319, the display unit 106 displays that the Bluetooth® Low Energy connection with the mobile phone 200 is completed. As a result, the screen of FIG. 4C is displayed on the display unit 106 of the digital camera 100.

After step P316, in step P320, the mobile phone 200 also displays that the Bluetooth® Low Energy connection with the digital camera 100 is completed. As a result, the screen of FIG. 4F is displayed on the screen of the mobile phone 200. After step P320, services via Bluetooth® Low Energy become available. In other words, after the acquisition of the wireless LAN connection information, the mobile phone 200 enters a state in which instructions for a handover can be input.

Figure 5:
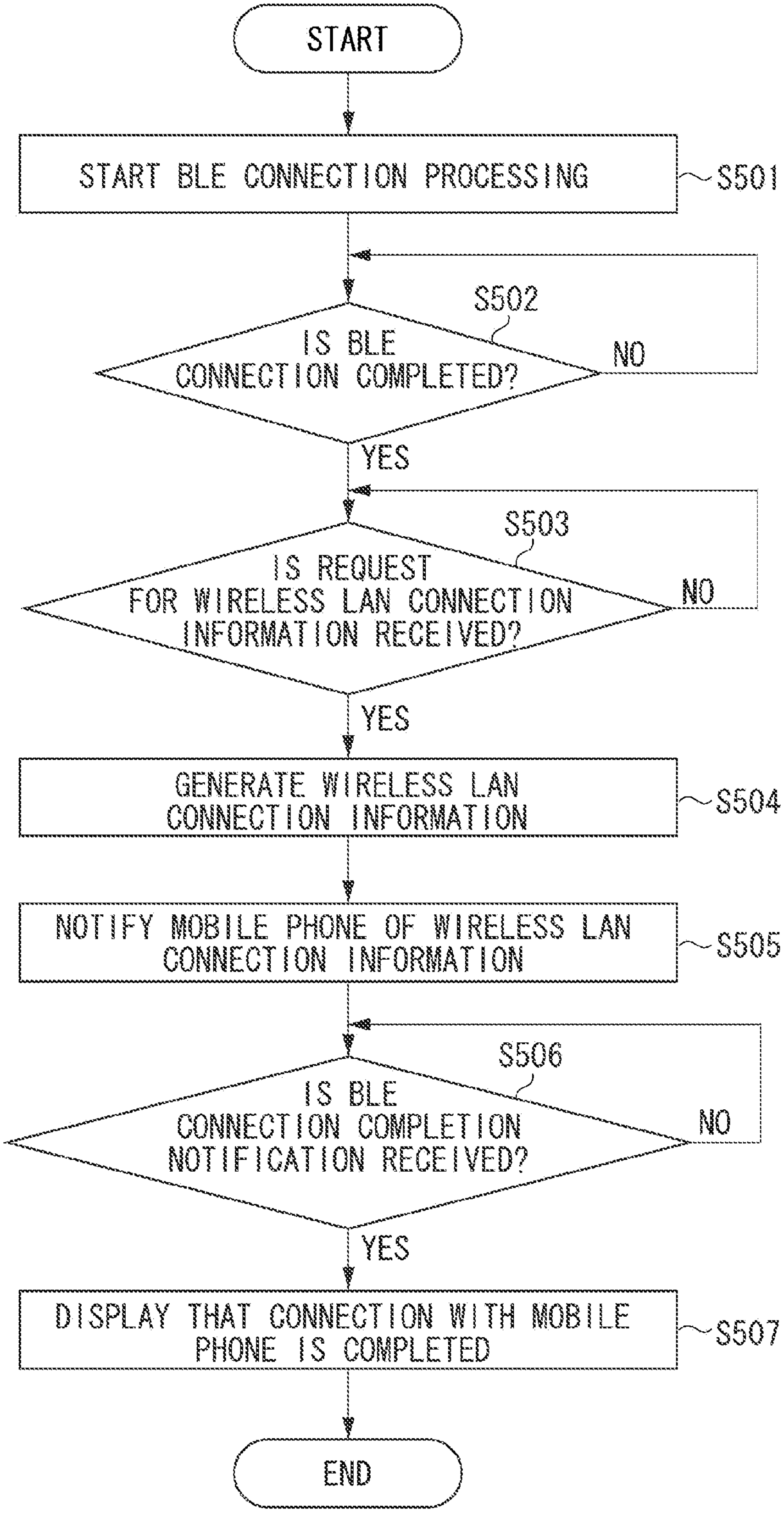
FIG. 5 illustrates a flowchart of wireless LAN connection information notification by Bluetooth communication of the digital camera according to the first exemplary embodiment.

FIG. 5 is a flowchart illustrating an operation of the digital camera 100 for implementing the foregoing sequence of FIG. 3. The processing of this flowchart is started when the operation unit 105 accepts an instruction to start Bluetooth® Low Energy connection processing with the mobile phone 200.

First, in step S501, the near field wireless communication unit 112 performs near field wireless communication connection processing with the mobile phone 200. Such processing corresponds to the processing of steps P303 to P310 in FIG. 3. In step S502, the control unit 101 waits until the Bluetooth® Low Energy connection with the mobile phone 200 is completed.

If the Bluetooth® Low Energy connection is established (YES in step S502), the processing proceeds to step S503. In step S503, the control unit 101 waits until a request for wireless LAN connection information is received from the mobile phone 200. If the near field wireless communication unit 112 receives a request for wireless LAN connection information from the mobile phone 200 (YES in step S503), the processing proceeds to step S504. In step S504, the near field wireless communication unit 112 notifies the control unit 101 of the request. The control unit 101 generates wireless LAN connection information. Such processing corresponds to the processing of steps P312 and P313 in FIG. 3.

In step S505, after the generation of the wireless LAN connection information, the control unit 101 notifies the mobile phone 200 of the wireless LAN connection information via the near field wireless communication unit 112. Such processing corresponds to the processing of steps P314 and P315 in FIG. 3.

In step S506, the near field wireless communication unit 112 waits until a Bluetooth® Low Energy connection completion notification is received from the mobile phone 200. If the near field wireless communication unit 112 receives a Bluetooth® Low Energy connection completion notification from the mobile phone 200 (YES in step S506), the processing proceeds to step S507.

In step S507, the near field wireless communication unit 112 notifies the control unit 101 of the reception. The control unit 101 displays on the display unit 106 that the connection with the mobile phone 200 is completed. Such processing corresponds to the processing of steps P317 to P319 in FIG. 3. Services via Bluetooth® Low Energy become available thereafter.

Figure 6:
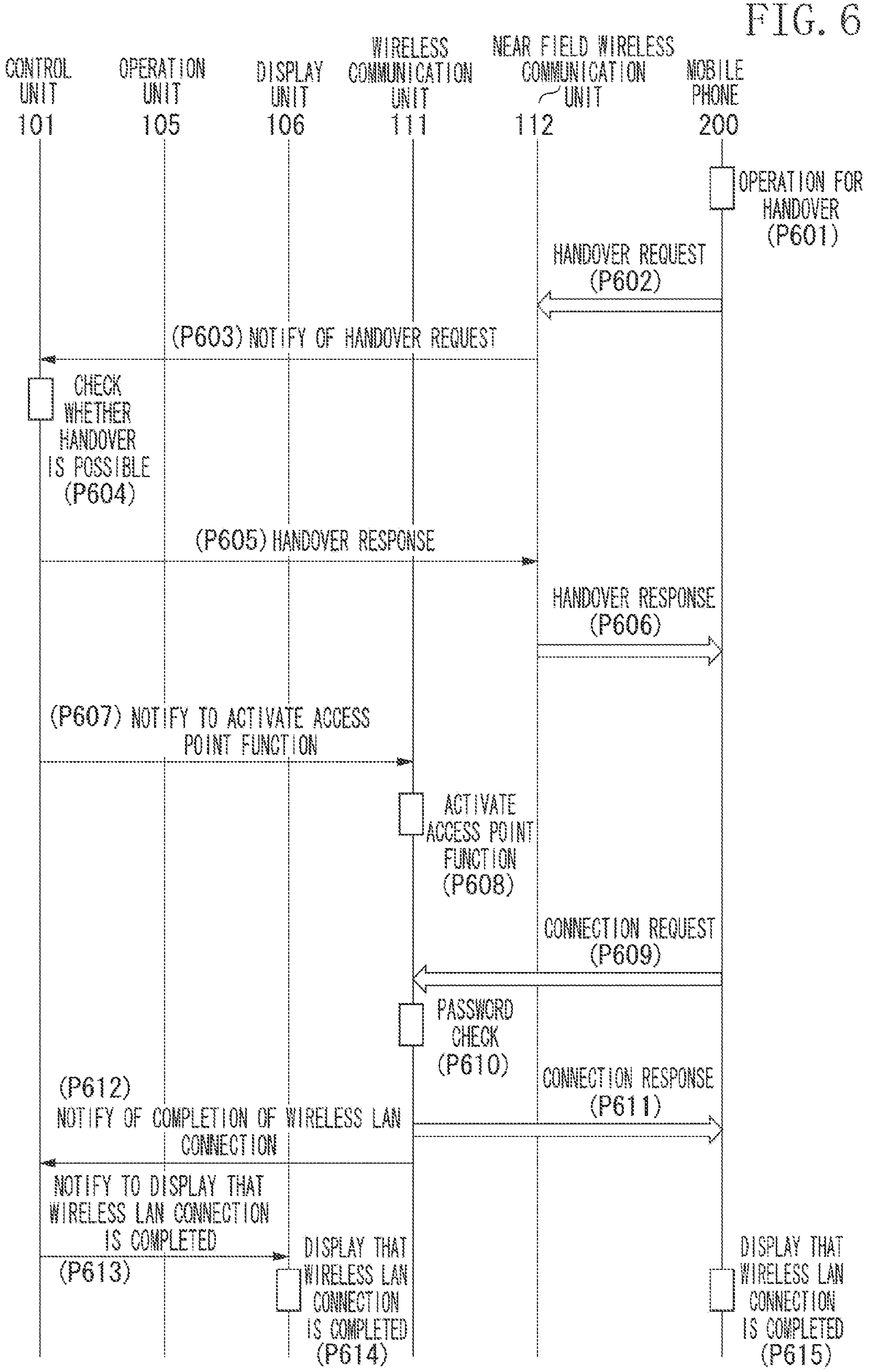
FIG. 6 illustrates a sequence for a wireless LAN handover by an operation of the mobile phone according to the first exemplary embodiment.

FIG. 6 illustrates a sequence of a handover from Bluetooth® Low Energy to a wireless LAN. The sequence is started in a state in which the digital camera 100 and the mobile phone 200 are connected by Bluetooth® Low Energy.

Figure 7A:
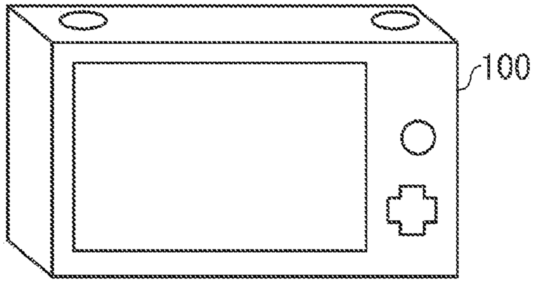
FIGS. 7A, 7B, 7C, 7D, 7D, and 7F are schematic diagrams illustrating an operation of the digital camera and the mobile phone during the wireless LAN handover by an operation of the mobile phone according to the first exemplary embodiment.
Figure 7B:
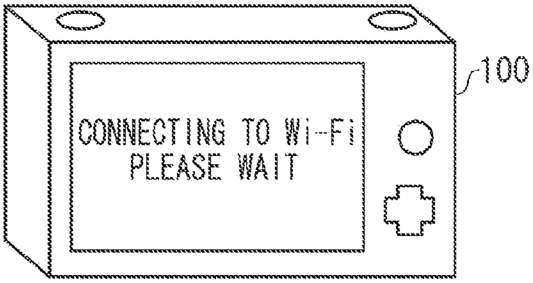
Figure 7C:
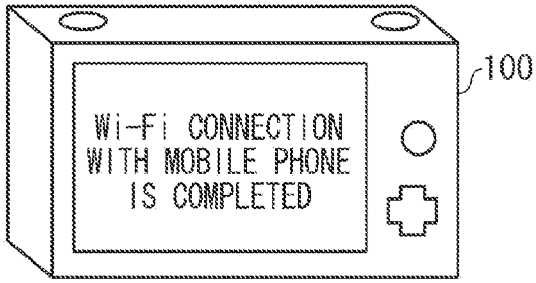
Figure 7D:
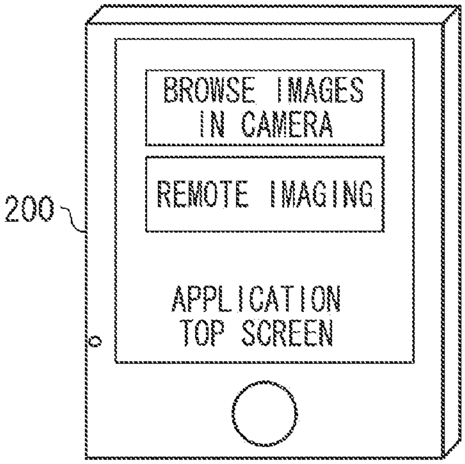
Figure 7E:
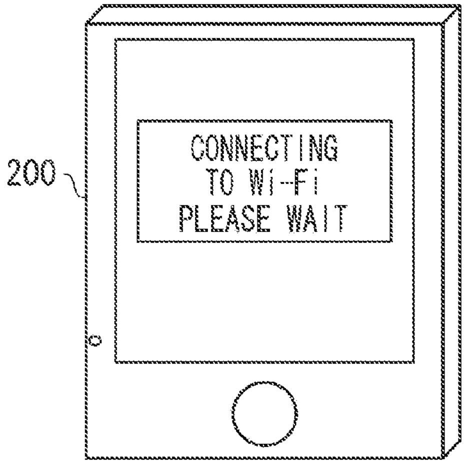

In step P601, the user inputs an operation for a handover to a wireless LAN from the mobile phone 200. For example, the screen illustrated in FIG. 7D is displayed on the mobile phone 200. The screen of FIG. 7D is an example of the screen of an application TOP menu. An in-camera image browsing button and a remote imaging button are displayed on the screen. The in-camera image browsing button is a button for starting a service for browsing images recorded in the digital camera 100 from the mobile phone 200 and transferring an image or images desired by the user from the digital camera 100 into the mobile phone 200. The remote imaging button is a button for starting a service for remotely controlling an imaging operation of the digital camera 100 from the mobile phone 200. Both the services communicate a large amount data, and are therefore implemented by communication via a wireless LAN, not Bluetooth® Low Energy. By selecting such buttons, the user requests the execution of the services and inputs a handover request as well.

In step P602, according to the user operation, the mobile phone 200 notifies the near field wireless communication unit 112 of the handover request via Bluetooth® Low Energy. In step P603, the near field wireless communication unit 112 receives the handover request from the mobile phone 200 and notifies the control unit 101 of receipt of the handover request. In step P604, the control unit 101 notified of the handover request determines whether a handover to the wireless LAN is possible. For example, if the wireless LAN is set by the operation unit 105 not to be used, the control unit 101 determines that the handover is not possible.

As described above, wireless LAN communication is higher than Bluetooth® Low Energy communication in power consumption. Therefore, if a remaining battery level is not sufficient to use the wireless LAN, the control unit 101 also determines that the handover is not possible. In step P605, the control unit 101 notifies the near field wireless communication unit 112 of a handover response based on the result of determination.

FIG. 6 illustrates a case in which the handover is determined to be possible in step P604. In such a case, the control unit 101 transmits a handover response (OK) indicating that the handover is possible to the near field wireless communication unit 112. In step P606, the near field wireless communication unit 112 transmits the handover response (OK) from the control unit 101 to the mobile phone 200. At this timing, the screen of the digital camera 100 transitions from the screen of FIG. 7A to the screen of FIG. 7B, whereby the user is notified that the wireless LAN is in process of connection.

After step P605, in step P607, the control unit 101 notifies the wireless communication unit 111 of the activation of the access point function. At that time, the control unit 101 also notifies the wireless communication unit 111 of the wireless LAN connection information generated in step P313. In step P608, the wireless communication unit 111 activates the access point function based on the wireless LAN connection information obtained from the control unit 101. In such a manner, the wireless communication unit 111 starts broadcasting a beacon including the SSID included in the wireless LAN connection information, whereby a network is generated.

In step P609, the mobile phone 200, if receiving the handover response (OK) from the near field wireless communication unit 112 in step P606, transmits a connection request to the wireless communication unit 111 based on the wireless LAN connection information obtained in step P313. In step P610, the wireless communication unit 111 receives the connection request from the mobile phone 200 and checks the password. More specifically, the wireless communication unit 111 compares the password transmitted to the mobile phone 200 in step P313 with the password received from the mobile phone 200 in step P609, and determines whether the passwords match each other. If the passwords match, the mobile phone 200 is determined to be an apparatus that may be connected. If the passwords do not match, the mobile phone 200 is determined to be an apparatus not to be connected.

In step P611, the wireless communication unit 111 transmits a connection response according to the result of the determination to the mobile phone 200. If the mobile phone 200 is determined to be an apparatus that can be connected, the control unit 101 performs control to notify the mobile phone 200 of the connection response (OK) via the wireless communication unit 111. If the mobile phone 200 is determined to be an apparatus not to be connected, the control unit 101 performs control to notify the mobile phone 200 of the connection response (NG) via the wireless communication unit 111.

Figure 7F:
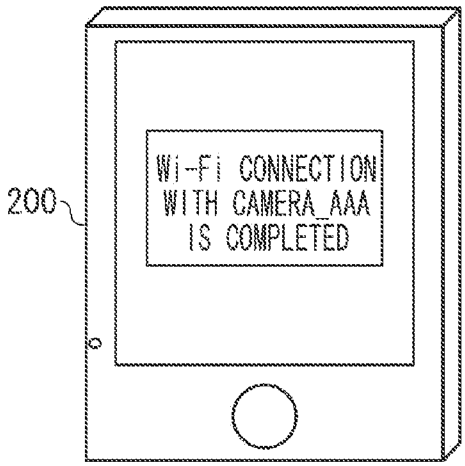

The following description is based on the assumption that in step P610, the mobile phone 200 is determined to be an apparatus that can be connected. In step P612, the wireless communication unit 111 transmits the connection response (OK) to the mobile phone 200, and then notifies the control unit 101 of the completion of the wireless LAN connection. In step P613, the control unit 101 notified of the completion of the wireless LAN connection notifies the display unit 106 to display that the wireless LAN connection is completed. In step P614, upon receiving the notification, the display unit 106 displays that the wireless LAN connection with the mobile phone 200 is completed. The screen of the digital camera 100 transitions to the screen of FIG. 7C. In step P615, the mobile phone 200, if receiving the connection response (OK) from the wireless communication unit 111 in step P611, displays that the wireless LAN connection with the digital camera 100 is completed. The screen of the mobile phone 200 transitions to the screen of FIG. 7F. In such a manner, wireless LAN communication is established between the digital camera 100 and the mobile phone 200.

Figure 8:
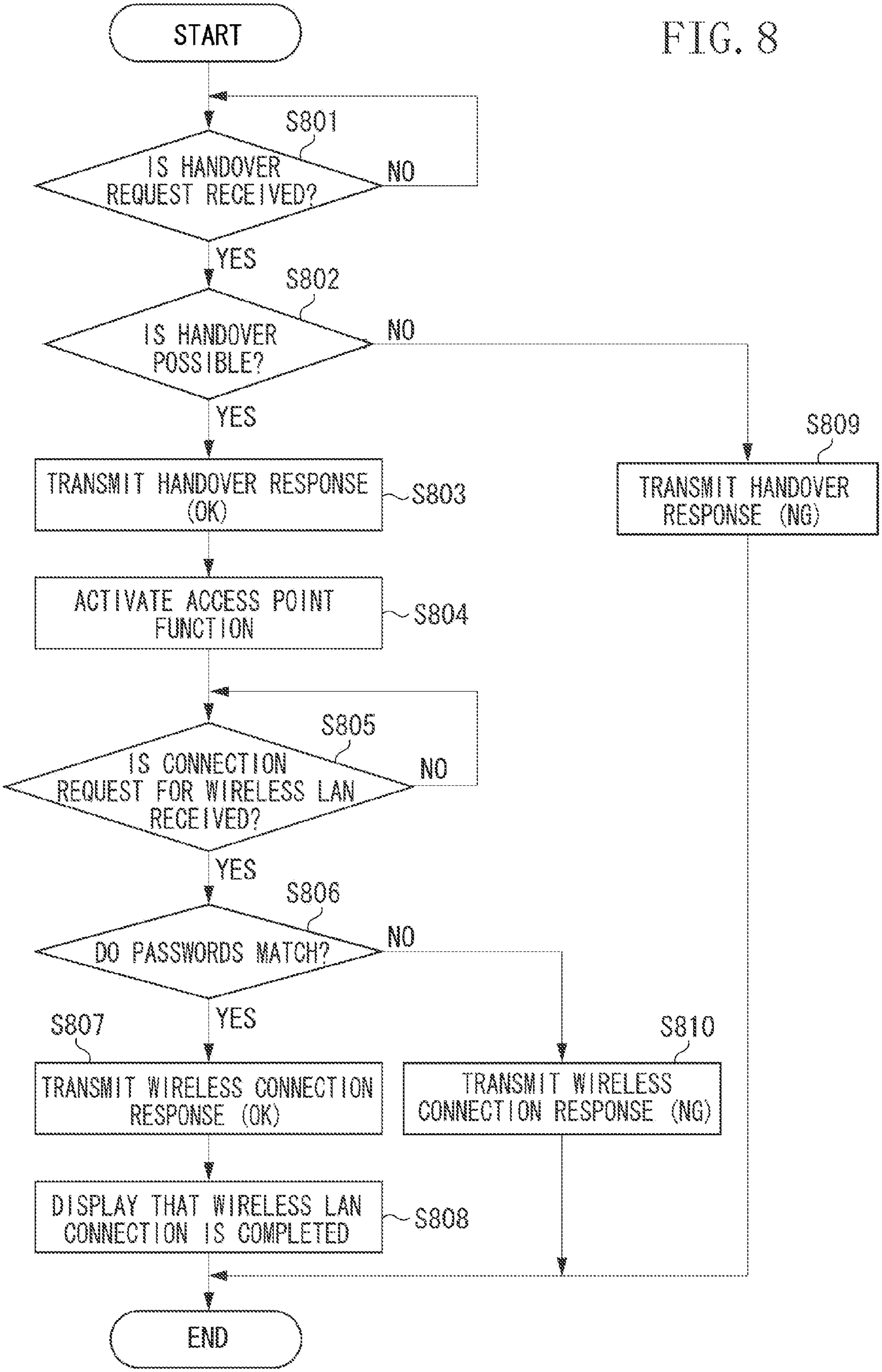
FIG. 8 is a flowchart of the wireless LAN handover by an operation of the mobile phone according to the first exemplary embodiment.

FIG. 8 is a flowchart illustrating an operation of the digital camera 100 during a handover according to the present exemplary embodiment. The processing of the flowchart is started in a state in which the digital camera 100 and the mobile phone 200 are connected by Bluetooth® Low Energy.

In step S801, the near field wireless communication unit 112 waits until a handover request is received from the mobile phone 200.

In step S801, if the near field wireless communication unit 112 receives a handover request from the mobile phone 200 (YES in step S801), the processing proceeds to step S802. In step S802, the near field wireless communication unit 112 notifies the control unit 101 of receipt of the handover request. In step S802, the control unit 101 determines whether the digital camera 100 is currently in a state in which a handover to the wireless LAN is possible. If the handover is determined to be possible (YES in step S802), the processing proceeds to step S803. In step S803, the control unit 101 transmits a handover response (OK) to the mobile phone 200 via the near field wireless communication unit 112.

After the control unit 101 notifies the near field wireless communication unit 112 of the handover response (OK), the control unit 101 requests the wireless communication unit 111 to activate the access point function. In step S804, the wireless communication unit 111 activates the access point function.

In step S805, the wireless communication unit 111 waits until a connection request for the wireless LAN is received from the mobile phone 200. If the wireless communication unit 111 receives a connection request for the wireless LAN from the mobile phone 200 (YES in step S805), the processing proceeds to step S806. In step S806, the wireless communication unit 111 determines whether the password from the mobile phone 200 and the password transmitted to the mobile phone 200 in step S505 of FIG. 3 match each other. If the passwords match (YES in step S806), the processing proceeds to step S807.

In step S807, the wireless communication unit 111 transmits a connection response (OK) to the mobile phone 200. Then, the wireless communication unit 111 notifies the control unit 101 of the completion of the wireless LAN connection. In step S808, the control unit 101 notified of the completion of the wireless LAN connection displays on the display unit 106 that the wireless LAN connection with the mobile phone 200 is completed.

In step S802, if the handover is determined not to be possible (NO in step S802), the processing proceeds to step S809. In step S809, the control unit 101 notifies the near field wireless communication unit 112 of a handover response (NG). The near field wireless communication unit 112 transmits the handover response (NG) to the mobile phone 200. Then, the processing ends. The mobile phone 200 receiving the handover response (NG) does not transmit a connection request for the wireless LAN.

In step S806, if the passwords are determined not to match each other (NO in step S806), the processing proceeds to step S810. In step S810, the control unit 101 notifies the wireless communication unit 111 of a connection response (NG) to the wireless LAN. The wireless communication unit 111 transmits the connection response (NG) to the wireless LAN to the mobile phone 200.

As described above, according to the present exemplary embodiment, if the digital camera 100 establishes a Bluetooth® Low Energy connection with the mobile phone 200 via the near field wireless communication unit 112, the digital camera 100 shares the communication parameters of the wireless LAN before an instruction for a handover is accepted by using Bluetooth® Low Energy. Since the communication parameters of the wireless LAN have already been shared when an instruction for a handover to the wireless LAN is input, communication for sharing the communication parameters of the wireless LAN does not need to be performed again. This can accordingly reduce the time until the wireless LAN connection is established.

In the first exemplary embodiment, the operation triggering the handover request is described to be made on the mobile phone 200. In a second exemplary embodiment, an operation triggering a handover request will be described that is made on the digital camera 100. The second exemplary embedment has many parts in common with the first exemplary embodiment. Those parts that are characteristic of the second exemplary embodiment will mainly be described.

Figure 9:
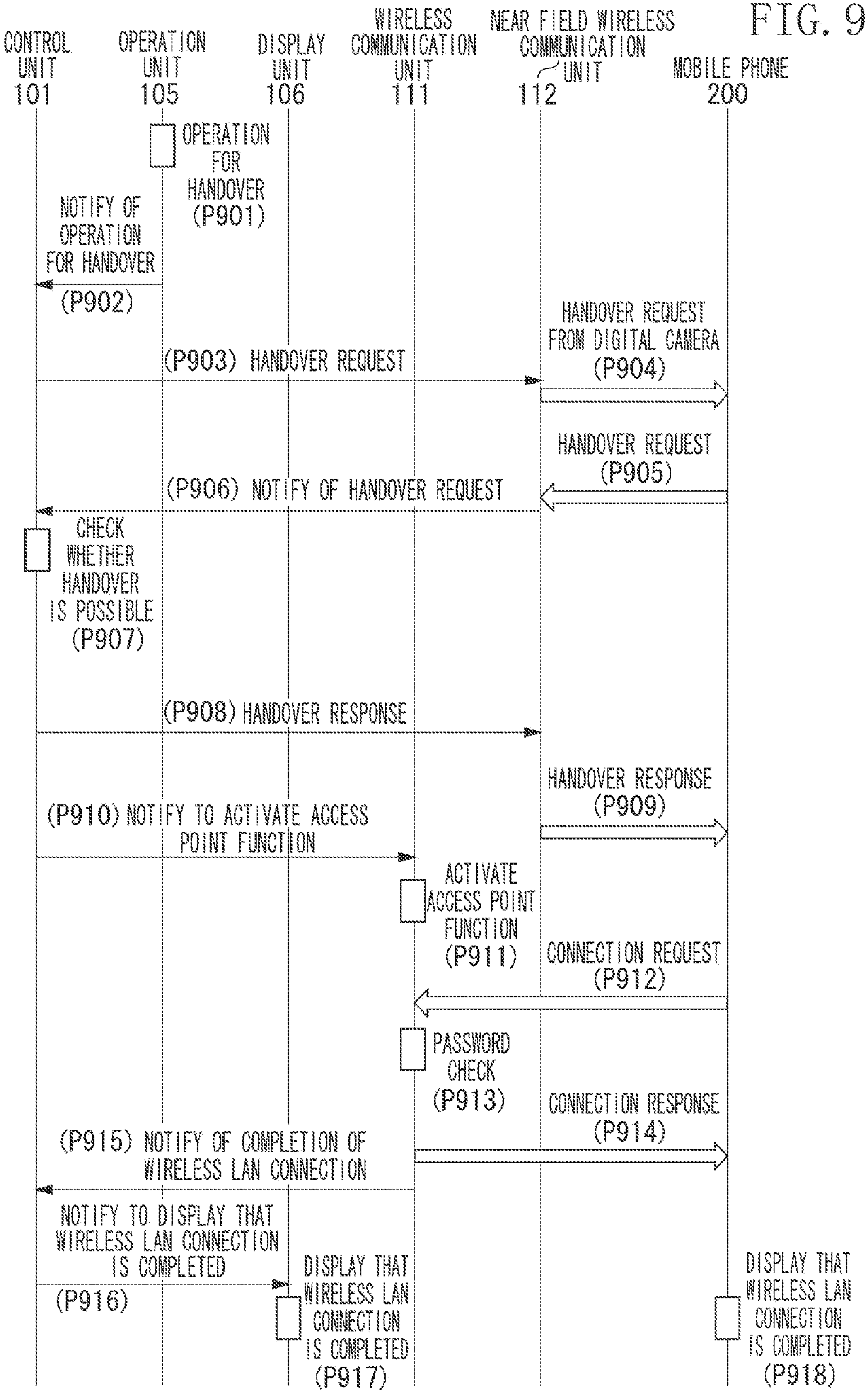
FIG. 9 illustrates a sequence for a wireless LAN handover by an operation of a digital camera according to a second exemplary embodiment.

FIG. 9 illustrates a sequence of a wireless LAN handover by an operation of the digital camera 100.

Figure 10:
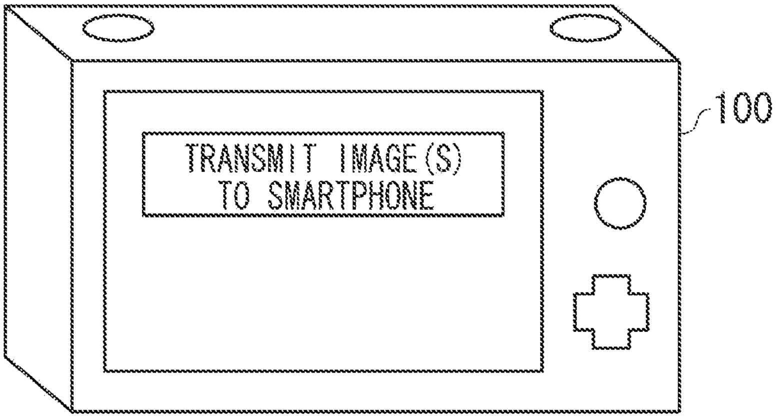
FIG. 10 is a schematic diagram illustrating an operation of the digital camera and a mobile phone during the wireless LAN handover by an operation of the digital camera according to the second exemplary embodiment.

First, in step P901, the user inputs an operation for a handover to the wireless LAN via the operation unit 105 of the digital camera 100. For example, a communication menu screen illustrated in FIG. 10 is displayed on the display unit 106 of the digital camera 100. The user can select the button "transmit image(s) to smartphone" to input an instruction for a handover to the wireless LAN. In response thereto, in step P902, the operation unit 105 notifies the control unit 101 that an operation for a handover is made.

In step P903, the control unit 101 notified thereof controls the near field wireless communication unit 112 to notify the mobile phone 200 of a handover request. In step P904, the near field wireless communication unit 112 transmits the handover request from the digital camera 100 to the mobile phone 200 according to the control of the control unit 101. The subsequent sequence is similar to that of step P602 and the subsequent steps in FIG. 6.

Figure 11:
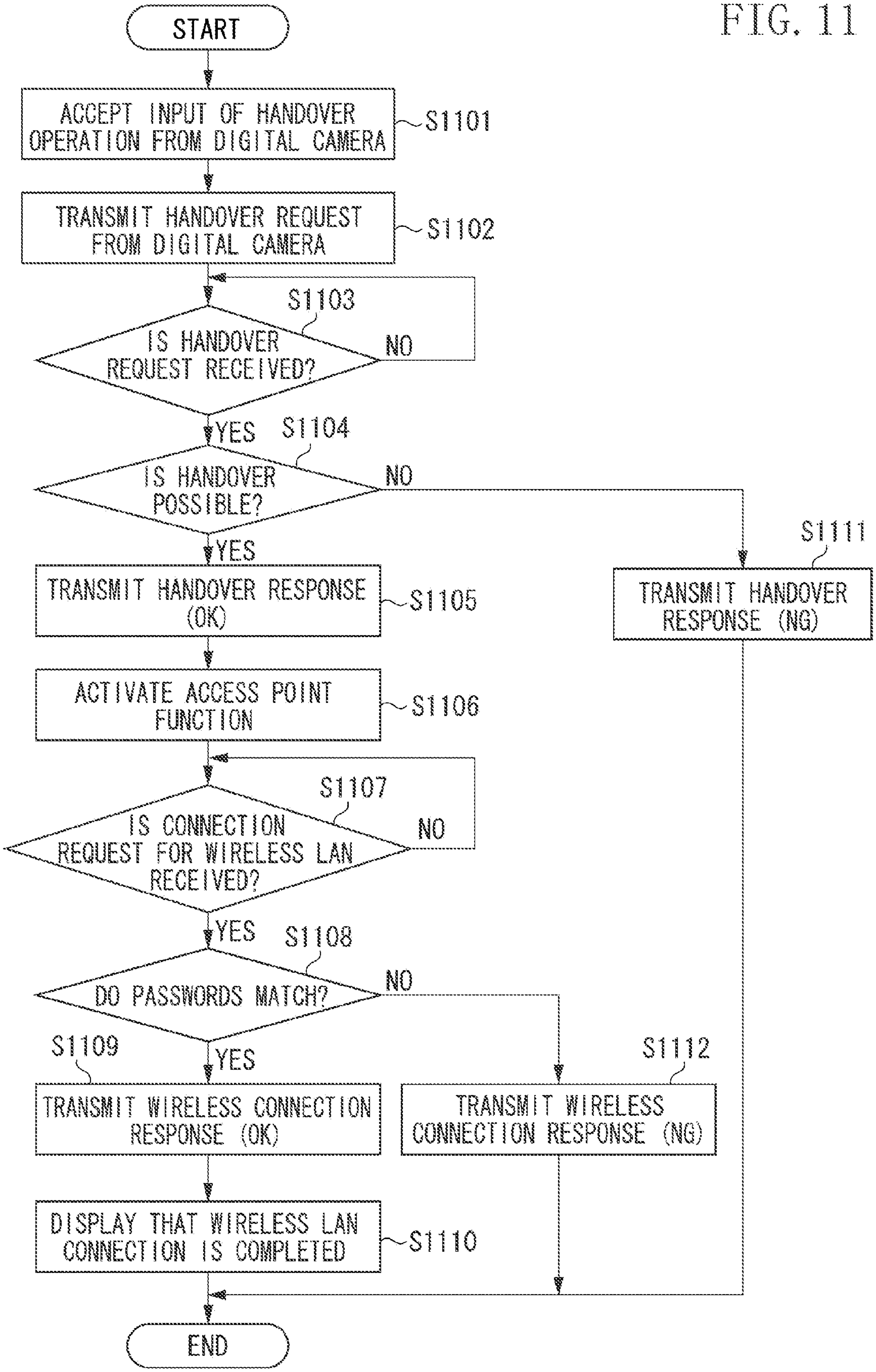
FIG. 11 is a flowchart of the wireless LAN handover with the mobile phone by the digital camera according to the second exemplary embodiment.

FIG. 11 is a flowchart of the wireless LAN handover by an operation on the digital camera 100. Both the functions by which the digital camera 100 requests a handover and by which the mobile phone 200 requests a handover can be included in the same system.

In step S1101, the user inputs a handover operation from the digital camera 100 on the operation unit 105. In step S1102, according to the handover operation, a handover request from the digital camera 100 is transmitted to the mobile phone 200 via the control unit 101 and the near field wireless communication unit 112. The subsequent processing of the flowchart is similar to that of the wireless LAN handover by an operation on the mobile phone 200 in FIG. 8, and thus, description is not repeated herein.

As described above, according to the present exemplary embodiment, in the case where the digital camera 100 establishes a Bluetooth® Low Energy connection with the mobile phone 200 via the near field wireless communication unit 112, the digital camera 100 shares the communication parameters of the wireless LAN before an instruction for a handover using Bluetooth® Low Energy is accepted. Since the communication parameters of the wireless LAN have already been shared when an instruction for a handover to the wireless LAN is input, communication for sharing the communication parameters of the wireless LAN does not need to be performed again. This can accordingly reduce the time until the wireless LAN connection is established.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-158903, filed Aug. 12, 2016, which is hereby incorporated by reference herein in its entirety.

What is claimed is:

1. A communication apparatus comprising:

a first wireless communication unit;

a second wireless communication unit; and a control unit, wherein the control unit is configured to perform control to periodically transmit an advertise from the second communication unit, upon receiving a response to the advertise by the second wireless communication unit, to start connection processing for getting connected to an external device via the second wireless communication unit, to share with the external apparatus a communication parameter to be used for communication via the first wireless communication unit after starting the connection processing, to notify a user of completion of the connection processing after completion of processing for sharing with the external apparatus, the communication parameter to be used for communication via the first wireless communication unit, and such that a service executable via the second wireless communication unit is not available for use until the completion of the processing for sharing with the external apparatus the communication parameter to be used for communication via the first wireless communication unit.

2. The communication apparatus according to claim 1, wherein a communication speed of communication by the first wireless communication unit is higher than a communication speed of communication by the second wireless communication unit.

3. The communication apparatus according to claim 1, wherein in a case where communication by the second wireless communication unit is established, an interval at which the communication is regularly performed is shared with the external apparatus.

4. The communication apparatus according to claim 3, wherein the interval is changeable after the communication by the second wireless communication unit is established.

5. The communication apparatus according to claim 1, wherein a communication parameter used in establishing communication by the first wireless communication unit is randomly changed each time the external apparatus is connected via the second wireless communication unit.

6. The communication apparatus according to claim 1, further comprising an imaging unit, wherein the communication apparatus is remotely controlled from the external apparatus connected via the first wireless communication unit to capture an image using the imaging unit.

7. The communication apparatus according to claim 1, further comprising an imaging unit, wherein the communication apparatus transmits an image captured via the imaging unit to the external apparatus based on a request from the external apparatus connected via the first wireless communication unit.

8. A communication apparatus comprising:

a first wireless communication unit;

a second wireless communication unit; and a control unit, wherein the control unit is configured to perform control to periodically transmit an advertise from the second wireless communication unit, upon receiving a response to the advertise by the second wireless communication unit, to start connection processing for getting connected to an external device via the second wireless communication unit, to share with the external apparatus a communication parameter used for communication via the first wireless communication unit after starting the connection processing, to become able to accept from a user an instruction for transmitting a connection request via the second communication unit to the external apparatus, said connection request being a request for connection via the first wireless connection unit after completion of processing for sharing with the external apparatus, the communication parameter used for communication via the first wireless communication unit, and such that a service executable via the second wireless communication unit is not available for use until the completion of the processing for sharing, with the external apparatus, the communication parameter to be used for communication via the first wireless communication unit.

9. The communication apparatus according to claim 8, wherein the control unit is configured to, in a case where the external apparatus is connected to the communication apparatus via the second wireless communication unit, execute the processing for sharing the communication parameter with the external apparatus via the second wireless communication unit, then issue a notification to the user that connection with the external apparatus via the second wireless communication unit is completed, and based on the notification, become able to accept from the user the instruction to transmit the request for connecting via the first wireless communication unit to the external apparatus via the second wireless communication unit, where the communication parameter is used in connecting to the external apparatus via the first wireless communication unit.

10. The communication apparatus according to claim 8, wherein a communication speed of communication by the first wireless communication unit is higher than a communication speed of communication by the second wireless communication unit.

11. The communication apparatus according to claim 8, wherein in a case where communication by the second wireless communication unit is established, an interval at which the communication is performed is shared with the external apparatus.

12. The communication apparatus according to claim 11, wherein the interval is changeable after the communication by the second wireless communication unit is established.

13. The communication apparatus according to claim 8, wherein a communication parameter used in establishing communication by the first wireless communication unit is randomly changed each time the external apparatus is connected to the communication apparatus via the second wireless communication unit.

14. The communication apparatus according to claim 8, further comprising an imaging unit, wherein the communication apparatus is remotely controlled from the external apparatus connected via the first wireless communication unit to capture an image using the imaging unit.

15. The communication apparatus according to claim 8, further comprising an imaging unit, wherein the communication apparatus is configured to transmit an image captured via the imaging unit to the external apparatus based on a request from the external apparatus connected via the first wireless communication unit.

16. A method for controlling a communication apparatus including a first wireless communication unit and a second wireless communication unit, the method comprising, performing control to, periodically transmit an advertise from the second wireless communication unit;

performing control to, upon receiving a response to the advertise by the second wireless communication unit, start connection processing for getting connected to an external device via the second wireless communication unit;

performing control to share with the external apparatus a communication parameter to be used for communication via the first wireless communication unit after starting the connection processing;

performing control to notify a user of completion of the connection processing after completion of processing for sharing with the external apparatus the communication parameter to be used for communication via the first wireless communication; and performing control such that a service executable via the second wireless communication unit is not available for use until the completion of the processing for sharing with the external apparatus, the communication parameter to be used for communication via the first wireless communication unit.

17. A method for controlling a communication apparatus including a first wireless communication unit and a second wireless communication unit, the method comprising, performing control to periodically transmit an advertise from the second wireless communication unit;

performing control to, upon receiving a response to the advertise by the second wireless communication unit, start connection processing for getting connected to an external device via the second wireless communication unit;

performing control to share, with the external apparatus, a communication parameter that is to be used for communication via the first wireless communication unit, after starting the connection processing;

performing control to become able to accept, from a user, an instruction for transmitting a connection request via the second wireless communication unit to the external apparatus, said connection request being a request for connection via the first wireless connection unit, after completion of processing for sharing, with the external apparatus, the communication parameter that is to be used for communication via the first wireless communication unit; and performing control such that a service that is executable via the second wireless communication unit is not available for use until the completion of the processing for sharing, with the external apparatus, the communication parameter that is to be used for communication via the first wireless communication unit.

18. A non-transitory computer-readable storage medium which stores a program for causing a communication apparatus including a first wireless communication unit and a second wireless communication unit to execute a method, the method comprising, performing control to periodically transmit an advertise from the second wireless communication unit;

performing control to, upon receiving a response to the advertise by the second wireless communication unit, start connection processing for getting connected to an external device via the second wireless communication unit;

performing control to share, with the external apparatus, a communication parameter that is to be used for communication via the first wireless communication unit, after starting the connection processing;

performing control to notify a user of completion of the connection processing after completion of processing for sharing, with the external apparatus, the communication parameter that is to be used for communication via the first wireless communication unit; and performing control such that a service that is executable via the second wireless communication unit is not available for use until the completion of the processing for sharing, with the external apparatus, the communication parameter that is to be used for communication via the first wireless communication unit.

19. A non-transitory computer-readable storage medium which stores a program for causing a communication apparatus including a first wireless communication unit and a second wireless communication unit to execute a method, the method comprising, performing control to, upon receiving a response to the advertise by the second wireless communication unit, start connection processing for getting connected to an external device via the second wireless communication unit;

performing control to share, with the external apparatus, a communication parameter that is to be used for communication via the first wireless communication unit, after starting the connection processing;

performing control to become able to accept, from a user, an instruction for transmitting a connection request via the second wireless communication unit to the external apparatus, said connection request being a request for connection via the first wireless connection unit, after completion of processing for sharing, with the external apparatus, the communication parameter that is to be used for communication via the first wireless communication unit; and performing control such that a service that is executable via the second wireless communication unit is not available for use until the completion of the processing for sharing, with the external apparatus, the communication parameter that is to be used for communication via the first wireless communication unit.

* * * * *